(12) United States Patent
Van Wiemeersch et al.

(10) Patent No.: US 12,546,896 B2
(45) Date of Patent: Feb. 10, 2026

(54) STEERING INTERACTION DETECTION

(71) Applicant: Ford Global Technologies, LLC, Dearborn, MI (US)

(72) Inventors: John Robert Van Wiemeersch, Novi, MI (US); Ryan Joseph Gorski, Grosse Pointe Farms, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 18/122,326

(22) Filed: Mar. 16, 2023

(65) Prior Publication Data
US 2024/0310526 A1  Sep. 19, 2024

(51) Int. Cl.
*G01S 17/894* (2020.01)
*B62D 6/10* (2006.01)
*B62D 15/02* (2006.01)
*G01S 7/4865* (2020.01)

(52) U.S. Cl.
CPC ............ *G01S 17/894* (2020.01); *B62D 6/10* (2013.01); *B62D 15/029* (2013.01); *G01S 7/4865* (2013.01)

(58) Field of Classification Search
CPC ......... B60W 40/08; B60W 2040/0854; B60W 2540/223
See application file for complete search history.

(56) References Cited

U.S. PATENT DOCUMENTS

| 6,049,747 | A  * | 4/2000  | Nakajima | B60N 2/0028 340/576 |
| 10,528,047 | B1 * | 1/2020  | Trujillo | G06N 3/0464 |
| 11,535,280 | B2 * | 12/2022 | Barth | B60W 60/0054 |
| 11,654,922 | B2 * | 5/2023  | Weston | G06V 40/107 340/576 |
| 2011/0187862 | A1 * | 8/2011 | Ishikawa | H04N 7/18 348/148 |
| 2016/0068103 | A1 * | 3/2016 | McNew | B60W 50/0097 701/23 |
| 2016/0303972 | A1 * | 10/2016 | Kühne | B60K 35/10 |

(Continued)

FOREIGN PATENT DOCUMENTS

CN  114852092 A  9/2022
EP  3967583 A1  3/2022

*Primary Examiner* — Lindsay M Low
*Assistant Examiner* — Brian R Kirby
(74) *Attorney, Agent, or Firm* — Frank Lollo; Price Heneveld LLP

(57) ABSTRACT

A method for detecting interaction of a user with a steering wheel for a vehicle includes generating, via a time-of-flight sensor, a point cloud representing a compartment of the vehicle. The point cloud includes three-dimensional positional information about the compartment. The method further includes identifying, via processing circuitry in communication with the time-of-flight sensor, the steering wheel in the compartment based on the point cloud. The method further includes comparing, via the processing circuitry, the point cloud to target point cloud data representative of the steering wheel clear of attachments. The method further includes determining one of a presence and an absence of an object on the steering wheel based on the comparison. The method further includes determining an alert condition based on the determination of one of the presence and the absence of the object.

19 Claims, 10 Drawing Sheets

(56) References Cited

U.S. PATENT DOCUMENTS

| | | | |
|---|---|---|---|
| 2016/0357186 A1* | 12/2016 | Dias | B60W 60/0055 |
| 2017/0155225 A1* | 6/2017 | Villeneuve | H01S 3/06754 |
| 2017/0368936 A1* | 12/2017 | Kojima | B60K 28/06 |
| 2018/0022356 A1* | 1/2018 | McBride | G01S 17/931 |
| | | | 340/439 |
| 2018/0093675 A1* | 4/2018 | Holub | B60W 60/0059 |
| 2018/0154903 A1* | 6/2018 | Song | B60W 60/0059 |
| 2018/0217262 A1* | 8/2018 | Albelo | G01S 7/4817 |
| 2018/0326992 A1* | 11/2018 | Aoi | B60W 50/08 |
| 2018/0329415 A1* | 11/2018 | Aoi | B60W 30/182 |
| 2019/0092346 A1* | 3/2019 | Odate | B62D 6/007 |
| 2020/0239007 A1* | 7/2020 | Sobhany | G05D 1/0061 |
| 2020/0247420 A1* | 8/2020 | Gunaratne | G06V 10/82 |
| 2020/0285231 A1* | 9/2020 | Herman | A61B 5/02455 |
| 2020/0320737 A1* | 10/2020 | Schiebener | G06T 7/74 |
| 2021/0387638 A1* | 12/2021 | Kim | B60W 40/08 |
| 2021/0397863 A1* | 12/2021 | Kose Cihangir | G06V 20/59 |
| 2021/0402942 A1* | 12/2021 | Torabi | B60W 50/14 |
| 2022/0161846 A1* | 5/2022 | Ghanbari | B60W 30/12 |
| 2023/0286550 A1* | 9/2023 | Shahriari | B60W 40/09 |

\* cited by examiner

STEERING INTERACTION DETECTION

FIELD OF THE DISCLOSURE

The present disclosure generally relates to a steering interaction detection and, more particularly, relates to detection and classification of attachments to a steering wheel of a vehicle.

BACKGROUND OF THE DISCLOSURE

Conventional monitoring techniques are typically based on visual image data. A detection system that captures depth information may enhance spatial determination.

SUMMARY OF THE DISCLOSURE

According to a first aspect of the present disclosure, a method for detecting interaction of a user with a steering wheel for a vehicle includes generating, via a time-of-flight sensor, a point cloud representing a compartment of the vehicle. The point cloud includes three-dimensional positional information about the compartment. The method further includes identifying, via processing circuitry in communication with the time-of-flight sensor, the steering wheel in the compartment based on the point cloud. The method further includes comparing, via the processing circuitry, the point cloud to target point cloud data representative of the steering wheel clear of attachments. The method further includes determining one of a presence and an absence of an object on the steering wheel based on the comparison. The method further includes determining an alert condition based on the determination of one of the presence and the absence of the object.

Embodiments of the first aspect of the present disclosure can include any one or a combination of the following features:
  determining an identity of the object when the object is present;
  determining a shape of the object based on the point cloud, and classifying the object as a hand or an article based on the shape;
  communicating an instruction to at least one vehicle system in response to the alert condition;
  adjusting, via the at least one vehicle system, an operational mode of the vehicle to be at least partially autonomous based on the alert condition;
  at the at least one vehicle system, communicating a first indication to remove the article from the steering wheel in response to classifying the object as the article;
  at the at least one vehicle system, communicating a second indication for the user to grab the steering wheel;
  receiving via a torque sensor configured to detect rotational force on the steering wheel torque information corresponding to a torque on the steering wheel;
  comparing the rotational force to the point cloud, wherein determination of one of the presence and the absence of the object is based on the comparison of the rotational force to the point cloud;
  determining a direction of a force caused by the object based on the torque information;
  receiving, via a touch sensor configured to detect contact with the steering wheel, a signal indicating engagement with the steering wheel, determination of one of the presence and the absence of the object is based on the signal;
  comparing the signal to the point cloud, wherein determination of one of the presence or the absence of the object is based on the comparison of the signal to the point cloud;
  determining the alert condition is based on the absence of the object, and further comprising communicating an instruction to at least one vehicle system in response to the alert condition, and adjusting, via the at least one vehicle system, an operational mode of the vehicle to be at least partially autonomous based on the alert condition; and
  the time-of-flight sensor includes a light detection and ranging (LiDAR) module configured to detect light having a wavelength of at least 1500 nm.

According to a second aspect of the present disclosure, a system for detecting interaction of a user with a steering wheel for a vehicle includes a time-of-flight sensor configured to generate a point cloud representing a compartment of the vehicle. The point cloud includes three- dimensional positional information about the compartment. The system further includes processing circuitry in communication with the time-of-flight sensor configured to identify the steering wheel in the compartment based on the point cloud, compare the point cloud to target point cloud data representative of the steering wheel clear of attachments, determine one of a presence and an absence of an object on the steering wheel based on the comparison, and determine an alert condition based on the determination of one of the presence and the absence of the object.

Embodiments of the second aspect of the present disclosure can include any one or a combination of the following features:
  at least one vehicle system configured to control an at least partially autonomous operating mode of the vehicle based on the alert condition;
  the processing circuitry is further configured to determine a shape of the object based on the point cloud, and classify the object as a hand or an article based on the shape;
  a first indication to remove the article from the steering wheel in response to the processing circuitry classifying the object as the article; and
  a second indication for the user to grab the steering wheel.

According to a third aspect of the present disclosure, a system for detecting interaction of a user with a steering wheel for a vehicle includes a time-of-flight sensor configured to generate a point cloud representing a compartment of the vehicle. The point cloud includes three-dimensional positional information about the compartment. The system further includes a vehicle system configured to control at least partially autonomous operation of the vehicle. The system further includes processing circuitry in communication with the time-of-flight sensor and the vehicle system. The processing circuitry is configured to identify the steering wheel in the compartment based on the point cloud, compare the point cloud to target point cloud data representative of the steering wheel clear of attachments, determine the presence of an object on the steering wheel based on the comparison, determine an alert condition based on determination of the presence of the object, determine an identity of the object, determine a shape of the object based on the point cloud, classify the object as a hand or an article based on the shape, and communicate an instruction to the vehicle system to adjust autonomous operation of the vehicle based on the classification of the object.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
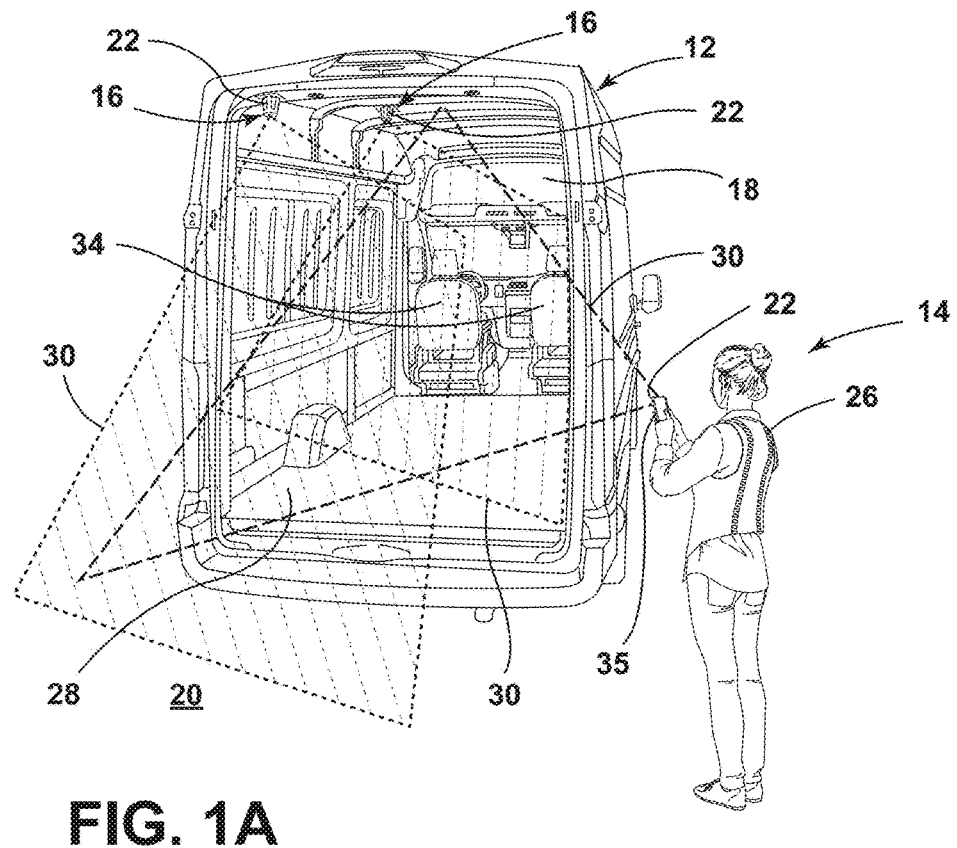
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a steering interaction detection. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5%of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similar to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive infrared (IR) or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light). Further, the three-dimensional mapping may be achieved without utilizing radio frequencies (RF), and therefore may limit or eliminate need for RF certifications for operation. Accordingly, sensors incorporated for monitoring frequencies and magnitudes of RF fields may be omitted by providing the present LiDAR modules 22.

Figure 1B:
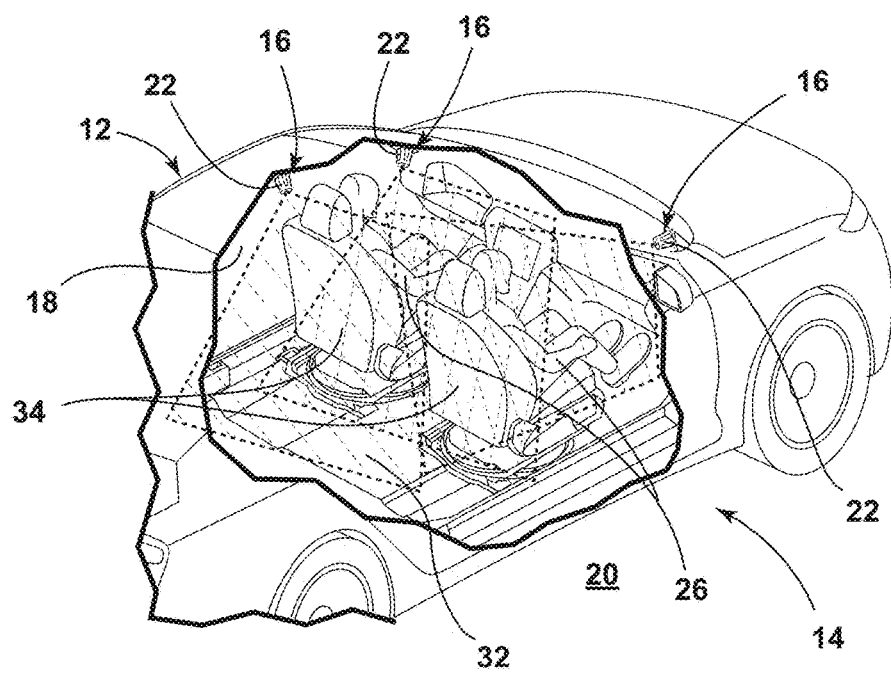
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
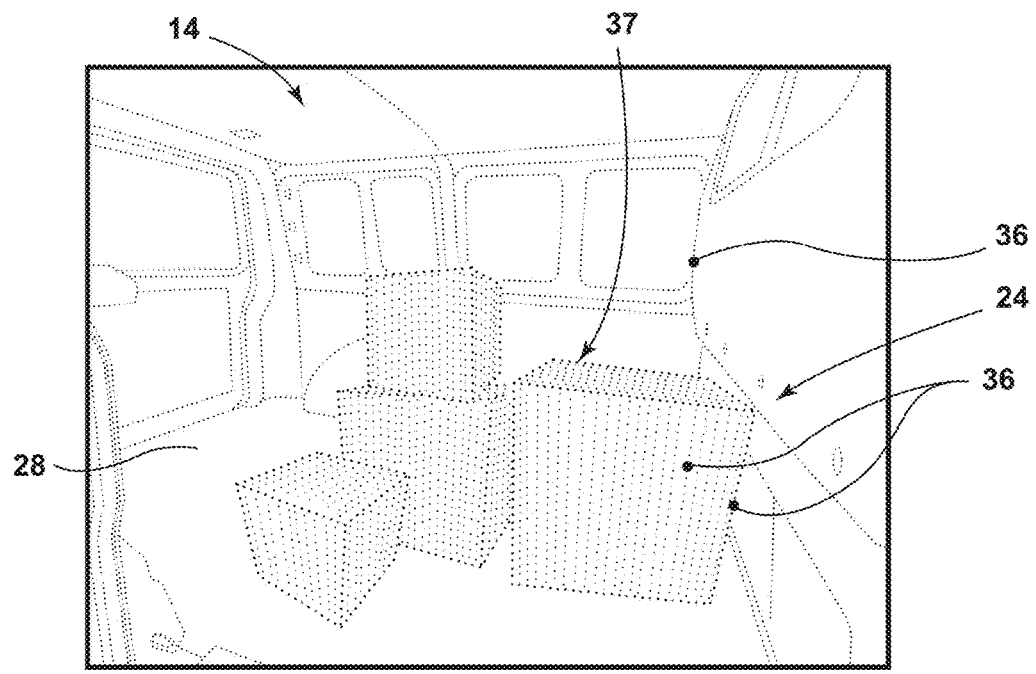
FIG. 2A is a representation of a point cloud generated by a time-of-flight sensor configured to monitor a rear space of a cargo van of the present disclosure.
Figure 2B:
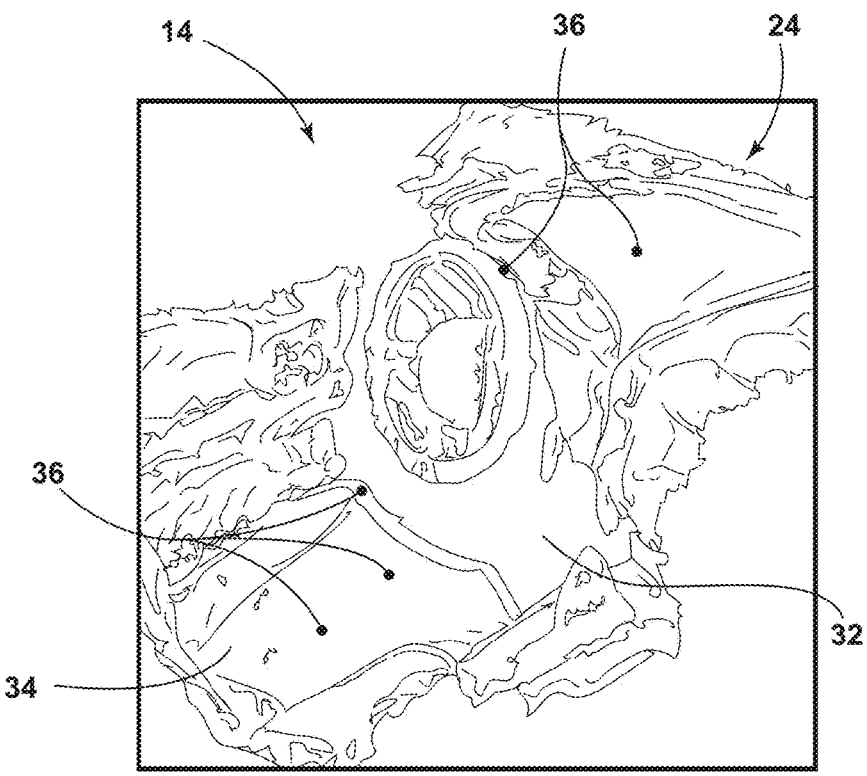
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicles 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point clouds 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the present system 10 may provide for enhanced monitoring methods to be performed without complex imaging methods, such as those incorporating stereoscopic imagers or other three-dimensional monitoring devices that may require higher computational power or decreased efficiencies.

Figure 3:
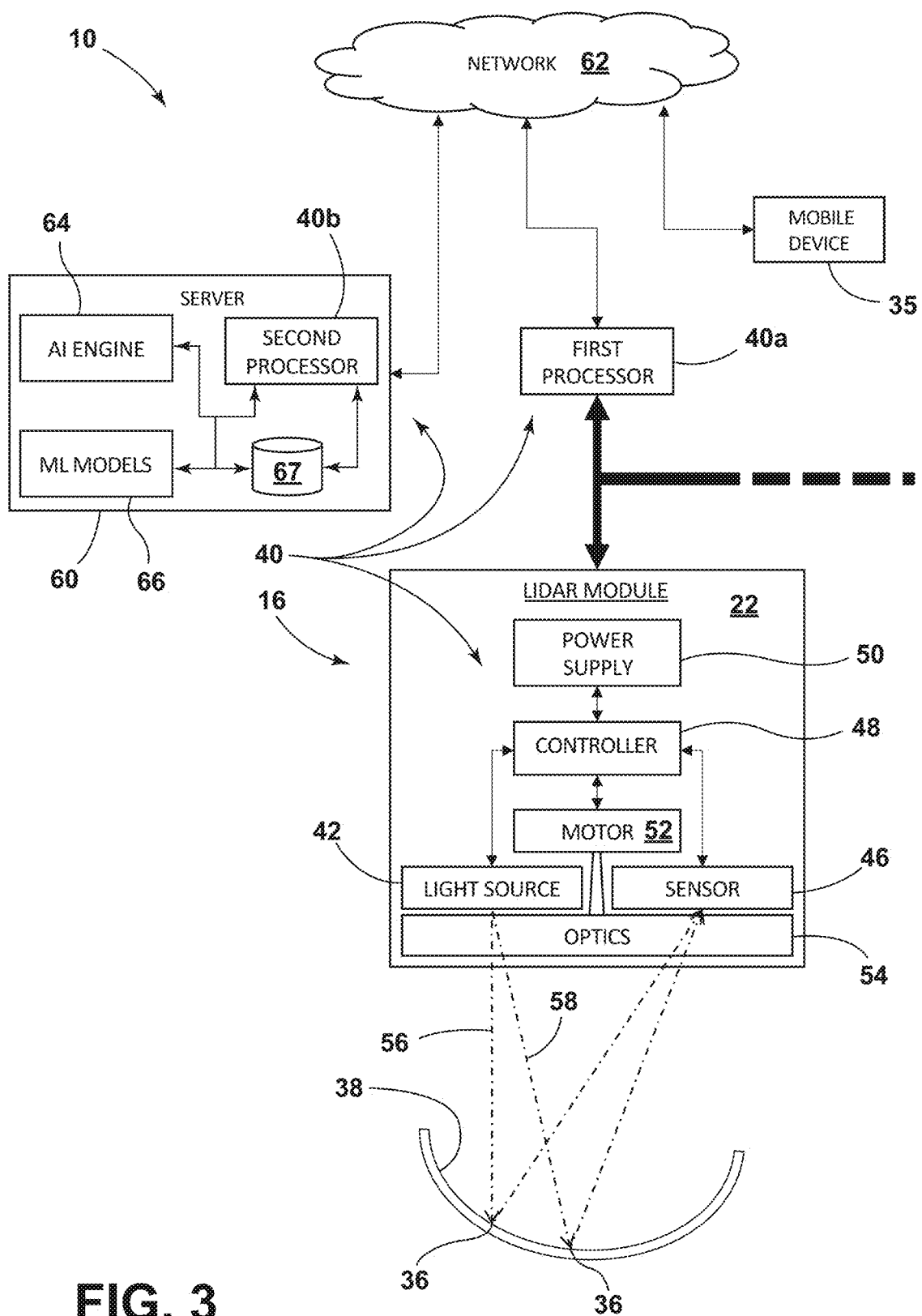
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40a local to the vehicle 12 and a second processor 40b remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40a may be configured to receive the at least one point cloud 24 from each LiDAR module 22 and compile each point cloud 24 of a common scene, such as the environment 14, to generate a more expansive or more accurate point cloud 24 of the environment 14.

The second processor 40b, which may be a part of a remote server 60 and in communication with the first processor 40a, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40b may be in communication with the AI engine 64, as well as in communication with a database 67 configured to store the target point cloud data and/or three-dimensional image information. Accordingly, the server 60 may incorporate a memory storing instructions that, when executed by the processor, cause the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
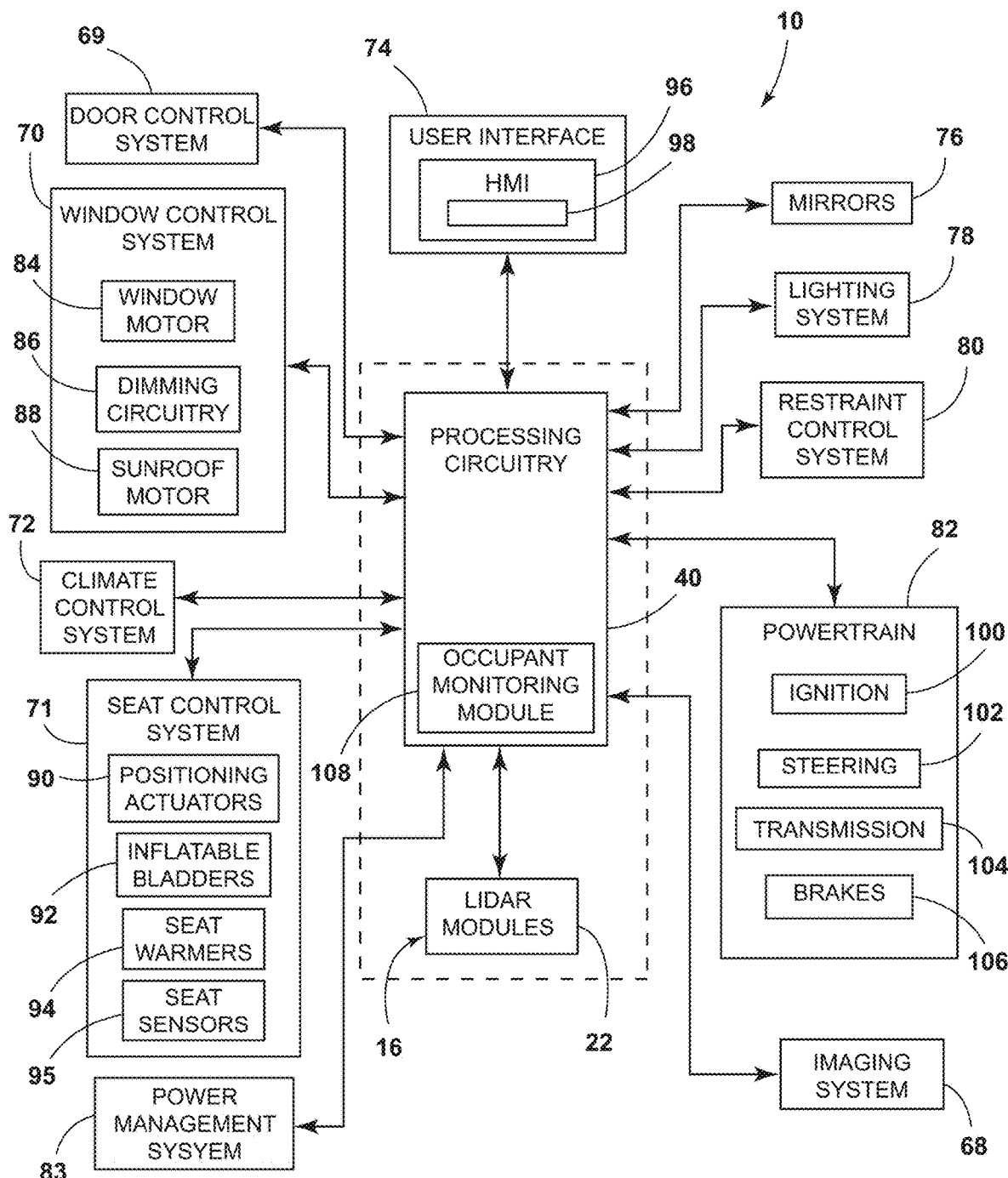
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 and/or the climate control system 72. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86, which may be glazing dimming circuitry 86, for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, up, down, side to side, or rotationally. Both a backrest of the seat 34 and a lower portion of the seat 34 may be configured to be adjusted by the positioning actuators 90. The inflatable bladders 92 may be provided within the seat 34 to adjust a firmness or softness of the seat 34, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. In other examples, the processing circuitry 40 may communicate one or more signals to the seat control system 71 based on body pose data identified in the at least one point cloud 24. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other techniques to estimate depth may be omitted due to utilization of the ToF sensors 16. Further, while multiple imaging devices from different angles of a common scene (e.g., a stereoscopic imager) may allow for more accurate estimation of depth information than those produced by a single camera, complex data processing techniques may be required for multiple cameras to be employed to gather the depth information. Further, such multi-camera systems may require additional weight, packaging volume, or other inefficiencies relative to the time-of-flight sensors 16 of the present disclosure.

Accordingly, the detection system 10 may be computationally-efficient and/or power-efficient relative to two-dimensional and three-dimensional cameras for determining positional information. Further, other time-of-flight sensing techniques, such as RADAR, while providing depth information, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional information about the environment 14 may be omitted due to the precision of the LiDAR. Thus, a solution may be provided by the detection system 10 by reducing the number of sensors required to monitor various aspects of the environment 14.

Referring now to FIGS. 5A-10, the present detection system 10 may be configured for detecting interaction of a user with steering for the vehicle 12. The detection system 10 includes the time-of-flight sensor 16 configured to generate the at least one point cloud 24 representing the compartment 28 of the vehicle 12. The at least one point cloud 24 includes three-dimensional positional information about the compartment 28. The processing circuitry 40 in communication with the time-of-flight sensor 16 is configured to identify a steering wheel 120 in the compartment 28 based on the at least one point cloud 24. The processing circuitry 40 is further configured to compare the at least one point cloud 24 to the target point cloud data representative of the steering wheel 120 clear of attachments 124. The processing circuitry 40 is further configured to determine one of a presence and an absence of an object 122 on the steering wheel 120 based on the comparison. In general, the exemplary detection system 10 of the present disclosure may provide for detection of attachments 124 to the steering wheel 120 of the vehicle 12 based on the at least one point cloud 24 generated by the LiDAR modules 22. In this way, LiDAR may be employed in the vehicle 12 to provide enhanced responsiveness based on user engagement with operation of the vehicle 12.

In some examples, the processing circuitry 40 is further configured to determine an identity of the object 122 when the object 122 is present. In some examples, the processing circuitry 40 is further configured to determine a shape of the object 122 based on the at least one point cloud 24 and classify the object 122 as a hand 126 or an article 128 based on the shape. In some examples, the processing circuitry 40 is further configured to communicate an instruction to at least one vehicle system in response to the alert condition. For example, the processing circuitry 40 may be configured to communicate an instruction to the user interface 74, the powertrain 82, the seat control system 71, the climate control system 72, or any of the previously described vehicle systems according to some aspects of the present disclosure.

In some examples, the at least one vehicle system is configured to communicate a first indication for the user to remove the article 128 from the steering wheel 120 in response to classifying the object 122 as the article 128. For example, the user interface 74 may present a message 130 having the first indication at the HMI 96.

In some examples of the present detection system 10, the at least one vehicle system is configured to communicate a second indication for the user to grab the steering wheel 120. For example, the user interface 74 may present the message 130 having the second indication at the HMI 96. In some examples, the detection system 10 includes a torque sensor 132 configured to detect rotational force on the steering wheel 120. The processing circuitry 40 may be configured to receive torque information corresponding to a torque 134 on the steering wheel 120. The processing circuitry 40 may further be configured to compare the rotational force to the at least one point cloud 24. Determination of one of the presence and the absence of the object 122 may be based further on the comparison of the rotational force to the at least one point cloud 24. For example, the processing circuitry 40 may identify a location of the object 122 on the steering wheel 120 and calculate a projected torque direction or magnitude and can compare such estimations to the torque information received at the processing circuitry 40 based on the rotational force detected by the torque sensor 132.

In some examples, the processing circuitry 40 is further configured to determine a direction of a force caused by the object 122 based on the torque information. For example, the processing circuitry 40 may identify the location and presence of the object 122 on the steering wheel 120 and associate the force with the object 122 detected based on the at least one point cloud 24.

In some examples, the detection system 10 may further include a touch sensor 136 configured to detect contact with the steering wheel 120. The processing circuitry 40 may be configured to receive a signal indicating engagement with the steering wheel 120 based on the contact detected by the touch sensor 136. Determination of one of the presence or the absence of the object 122 may be based further on the signal from the touch sensor 136. It is contemplated that either or both of the touch sensor 136 and the torque sensor 132 may be incorporated into the steering system 102 previously described with respect to FIG. 4 and presented again in FIG. 7 in greater detail. Accordingly, the present detection system 10 may include the torque sensor 132 and the touch sensor 136 and compare sensor data (e.g., capacitive or other "hard" feedback information) to the at least one point cloud 24.

In some examples, the processing circuitry 40 is further configured to compare the signal to the at least one point cloud 24. Determination of one of the presence and the absence of the object 122 may be based further on the comparison of the signal to the at least one point cloud 24.

In some examples, the processing circuitry 40 is configured to determine the alert condition based on the absence of the object 122. In such examples, the processing circuitry 40 may be configured to communicate an instruction to the at least one vehicle system in response to the alert condition. The at least one vehicle system may be configured to adjust an operational mode of the vehicle 12 to be at least partially autonomous based on the alert condition. For example, if the processing circuitry 40 detects that hands 126 of the user are not in contact with or otherwise engaged with the steering wheel 120 (e.g., absent), the processing circuitry 40 may communicate an instruction to the powertrain 82, such as the steering system 102 of the powertrain 82 and/or other systems of the powertrain 82, to engage in fully or semi-autonomous steering, braking, movement, or the like.

Referring still to FIGS. 5A-10, the present detection system 10 may be utilized to scan and track the shape of the body and limbs of the driver 26 and, with appropriate algorithms, determine where the hands 126 of the driver 26 are located and the orientation or motion of the hands 126. Based on the ability to track the physical dimensions of the driver, the detection system 10 may be configured to determine three-dimensional vectors for the user's hands 126 including a moving direction or a pointing direction. In particular, the present detection system 10 may be configured to detect contact of the hands 126 of the user based on the at least one point cloud 24 generated by the LiDAR modules 22. Similarly, the present detection system 10 may detect any other form of object 122 engaging the steering wheel 120, such as articles (e.g., mechanisms, widgets, consumer goods, etc.). Based on the shapes of the at least one point cloud 24, the detection system 10 may differentiate between hands 126 of the user and these articles. Accordingly, the present detection system 10 may provide for anti-spoofing measures and added user interaction detection for controlling operational modes of the vehicle 12 or alerting occupants 26 or other users as to a level of distraction or off-target focus of the user.

Figure 5A:
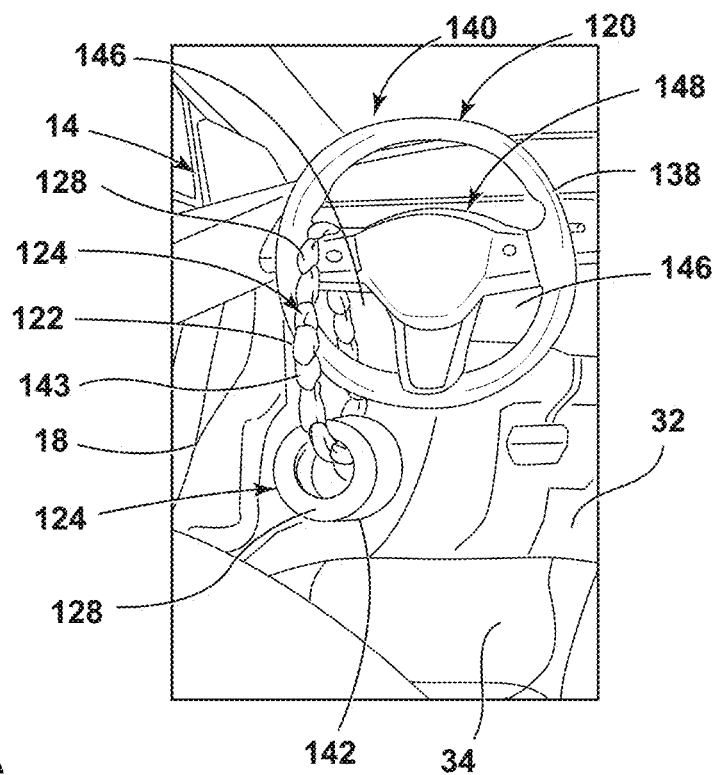
FIG. 5A is a front perspective view of a steering wheel having a first article attached thereto.
Figure 5B:
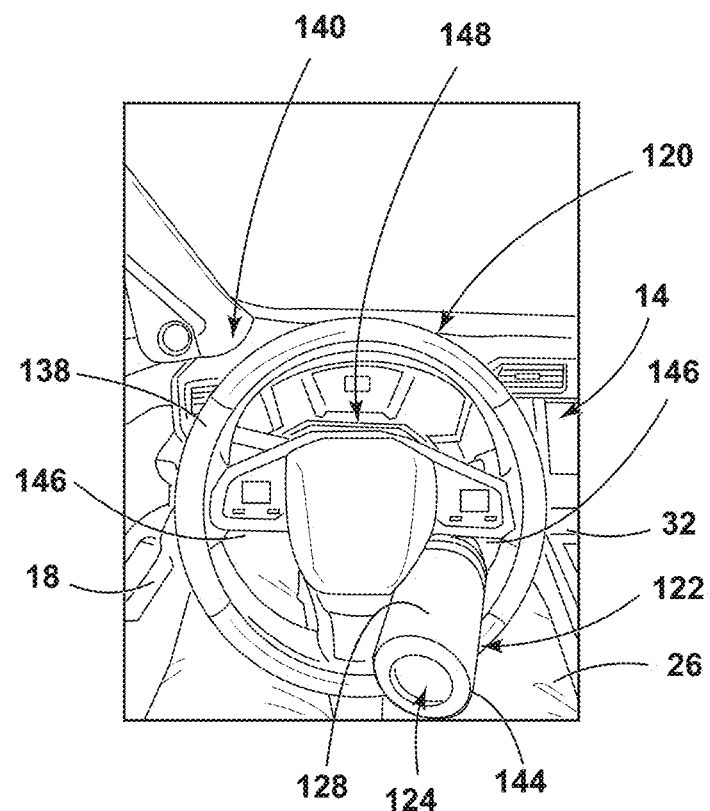
FIG. 5B is a front perspective view of a steering wheel having a second article attached thereto.

With particular reference to FIGS. 5A and 5B, two examples of attempts to bypass a user engagement detection circuit are illustrated. With reference to FIG. 5A, a combination of articles 128 are employed to engage with an outer portion 138 of the steering wheel 120 to provide a downward force on a left-hand side 140 of the steering wheel 120 to cause a counterclockwise rotational force on the steering wheel 120. In the present example, a weight 142 is attached to the steering wheel 120 via a band 143 looped around the outer portion 138 of the steering wheel 120 and around the weight 142. In this example, the band 143 and weight 142 combination attachment 124 may flag or activate the touch sensor 136 for the steering wheel 120 to spoof or bypass a check for engagement of the user with the steering wheel 120. Accordingly, the physical sensors (e.g., the torque sensor 132 and the touch sensor 136) may sense the detection of engagement with the steering wheel 120 and torque 134 on the steering wheel 120 and, based on detection of these factors, the user engagement detection circuit may determine an engagement condition with the steering wheel 120. Accordingly, the time-of-flight sensors 16 of the present disclosure may be utilized to limit false positive detections by the user engagement detection circuit by distinguishing the object 122 on the steering wheel 120 based on the shape of the at least one point cloud 24. Further, the present time-of-flight sensors 16 may generate the at least one point cloud 24 to allow the processing circuitry 40 to determine the absence of the object 122 on the steering wheel 120 (e.g., the absence of hands 126 on the steering wheel 120).

In another example illustrated in FIG. 5B, an elongated member, such as a bottle 144, engages the steering wheel 120 on a right-hand side of the steering wheel 120 and is disposed within a cavity 146 between the outer portion 138 of the steering wheel 120 and the inner portion 148 of the steering wheel 120. The location and weight distribution of the water bottle 144 may cause a clockwise rotational force on the steering wheel 120. Further, engagement of the water bottle 144 with the outer portion 138 of the steering wheel 120 may cause the touch sensor 136 to be flagged. Thus, pushing forces 150 (see FIG. ˆA) and pulling forces 154 (see FIG. 6B) may be applied to the steering wheel 120 by the object 122 to cause the rotational force on the steering wheel 120 and spoof the touch sensor 136 for the steering wheel 120.

Figure 6A:
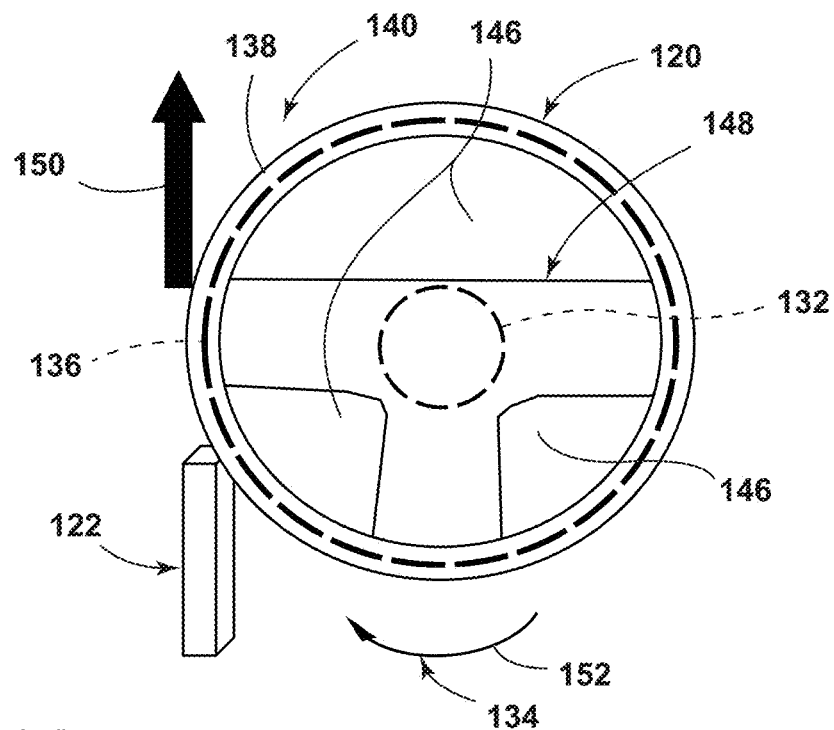
FIG. 6A is a front schematic view illustrating a steering wheel undergoing an upward pushing force caused by an attachment.
Figure 6B:
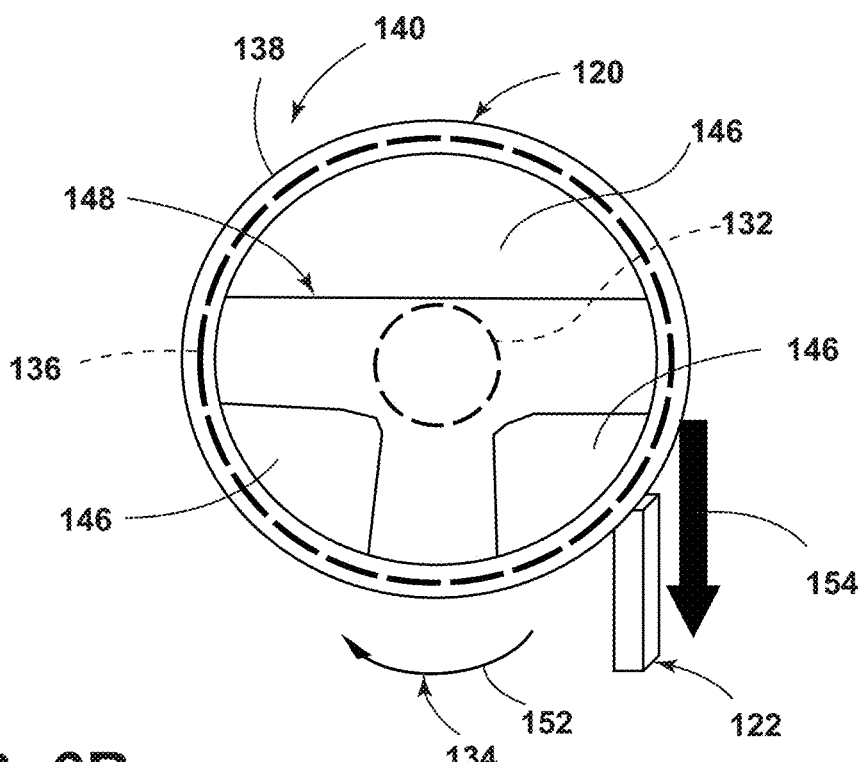
FIG. 6B is a front schematic view illustrating a steering wheel undergoing a downward pulling force caused by an attachment.

With particular reference to FIGS. 6A and 6B, a schematic diagram depicting the touch sensor 136 and the torque sensor 132 of the steering wheel 120 are illustrated in reference to an example of an object 122 pushing on the steering wheel 120 and an example of the object 122 pulling on the steering wheel 120. With particular reference to FIG. 6A, a pushing force 150 may be provided by the object 122 on the left-hand side 140 of the steering wheel 120 to cause a clockwise torque 152 on the steering wheel 120. Accordingly, the torque sensor 132 may be flagged and the touch sensor 136 may be flagged due to contact of the object 122 with the outer portion 138 of the steering wheel 120. In the example illustrated in FIG. 6B, the clockwise torque 152 may be achieved by a pulling force 154 by an object 122 coupled to the right-hand side of the steering wheel 120, resulting in the downward pulling force 154. In each example, the object 122 may flag both the torque sensor 132 and the touch sensor 136. However, the particular object 122 (e.g., an identity of the object 122) may be unknown or not easily tracked in the absence of the present LiDAR modules 22.

Figure 7:
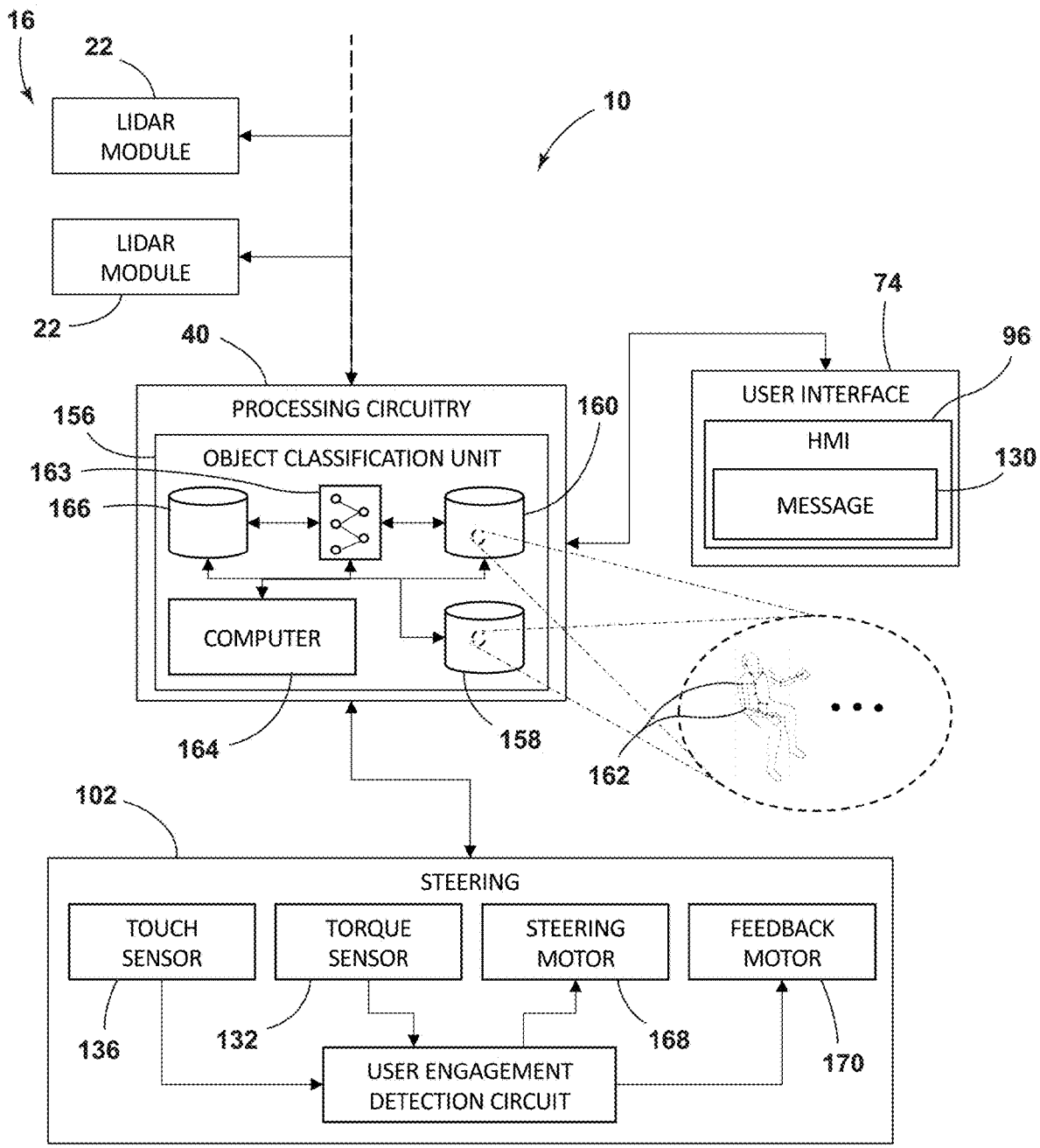
FIG. 7 is a block diagram of an exemplary detection system for a vehicle.

Referring now to FIG. 7, the processing circuitry 40 may include an object classification unit 156 that may be configured to distinguish between hands 126 of the user and foreign objects, such as the articles 128 previously described. The object classification unit 156 may include a body pose database 158 that is configured to store body pose data related to various positions and postures of the hands 126 and body of the occupants 26. For example, the body pose data may include positional information related to various hand 126 positions on the steering wheel 120 and corresponding arm orientations. The dimensional information may be stored in the form of point cloud data, or target point cloud data corresponding to the various positions (e.g., hands at 10-and-2, 9-and-3, hands 126 at opposite sides of the steering wheel 120, hands 126 on lower parts of the steering wheel 120). The object classification unit 156 may further include a skeleton model database 160 configured to store key points 162 corresponding to various joints and other body segments of the user. Such key points 162 may be combined with the body pose data to provide a more accurate estimate of hand 126 position and orientation, as well as ergonomic levels for various placement of the hands 126 and fingers, forearms, or other body postures for the arms 178 and hands 126 of the user. An example of a system for generating three-dimensional reference points based on similarity measures of reference points is described in U.S. patent application Publication No. 2022/0256123, entitled "Enhanced Sensor Operation," the entire disclosure of which is herein incorporated by reference.

At least one neural network 163 may be provided for processing the body pose data and the skeleton models to generate the target point for comparison to the at least one point cloud 24 generated by the LiDAR modules 22. For example, a computer 164 may be in communication with the body pose database 158 and the skeleton model database 160, and the neural network 163 may be employed for comparison to the at least one point cloud 24 generated by the LiDAR modules 22. It is contemplated that the processing circuitry 40 may include the object classification unit 156 and/or the object classification unit 156 may be separate from the processing circuitry 40 and/or associated with the server 60 previously described.

It is contemplated that the present detection system 10 may include an attachment classification database 166 configured to store a library of device shapes corresponding to shapes of different objects 122. The attachment classification database 166 may further be configured to store torque data corresponding to the shape of the various devices. For example, heavy devices corresponding to a larger point cloud 24 associated with the object 122 may correspond with higher torque values in the attachment classification database 166. The various shapes and identities of the objects 122 may be accessible via the object classification unit 156 and employed for training various machine learning models 66 configured to identify the particular identity of the various attachments 124. Such identities may correspond to the various torques that may be estimated based on the data stored in the attachment classification database 166. Accordingly, the detection system 10 may allow for faster detection of objects 122 and allow for a greater versatility and detection of objects 122 employed for spoofing attempts are changed.

As previously described, the processing circuitry 40 is in communication with the steering system 102 and, more particularly, the user engagement detection circuit. In some examples, the user engagement detection circuit is part of the processing circuitry 40, such that information from the touch sensor 136, the torque sensor 132, and instructions communicated to/from the steering motor 168 and a feedback motor 170 for the steering system 102 is provided by the processing circuitry 40. In the exemplary configuration illustrated in FIG. 7, the steering system 102 incorporates the user engagement detection circuit, and the signals and feedback from the various components of the steering system 102 are communicated to/from the processing circuitry 40, via the user engagement detection circuit. By accessing data in the steering system 102, the processing circuitry 40 may be configured to compare signals from the touch and torque sensors 132 to the three-dimensional positional data in the at least one point cloud 24 generated by the LiDAR modules 22. Accordingly, shape detection and association/classification for identifying objects 122 engaging the steering wheel 120 may be compared to sensor information from capacitive, inductive, or other sensors. For example, the steering motor 168 and feedback motor 170 may each include an encoder or other positional information related to the rotation of the steering wheel 120, including a directional motion (e.g., clockwise or counterclockwise), a rate of motion, and/or other sensor information that is based on monitoring of the steering motor 168 and/or the feedback motor 170. It is contemplated that the feedback motor 170 may refer to an actuator that is configured to simulate feedback based on road conditions and an orientation of the steering wheel 120, and the steering motor 168 may refer to an actuator that directly or indirectly drives the steering system 102 of the vehicle 12. For example, torque 134 felt by the user in response to rotating the steering wheel 120 may be simulated in a steer-by-wire system. It is contemplated that, in some examples, the steering system 102 does not include the feedback motor 170 or the steering motor 168.

Still referring to FIG. 7, the processing circuitry 40 may be in communication with the user interface 74 as previously described. The HMI 96 may be configured to present the message 130, which may include the first and second indications previously described and/or various instructions for the user to engage the steering wheel 120. For example, upon determination that there are no hands 126 on the steering wheel 120 and/or a foreign object is detected engaging the steering wheel 120, the processing circuitry 40 may communicate an instruction to present an indication of such states via the message 130 at the HMI 96.

Figure 8A:
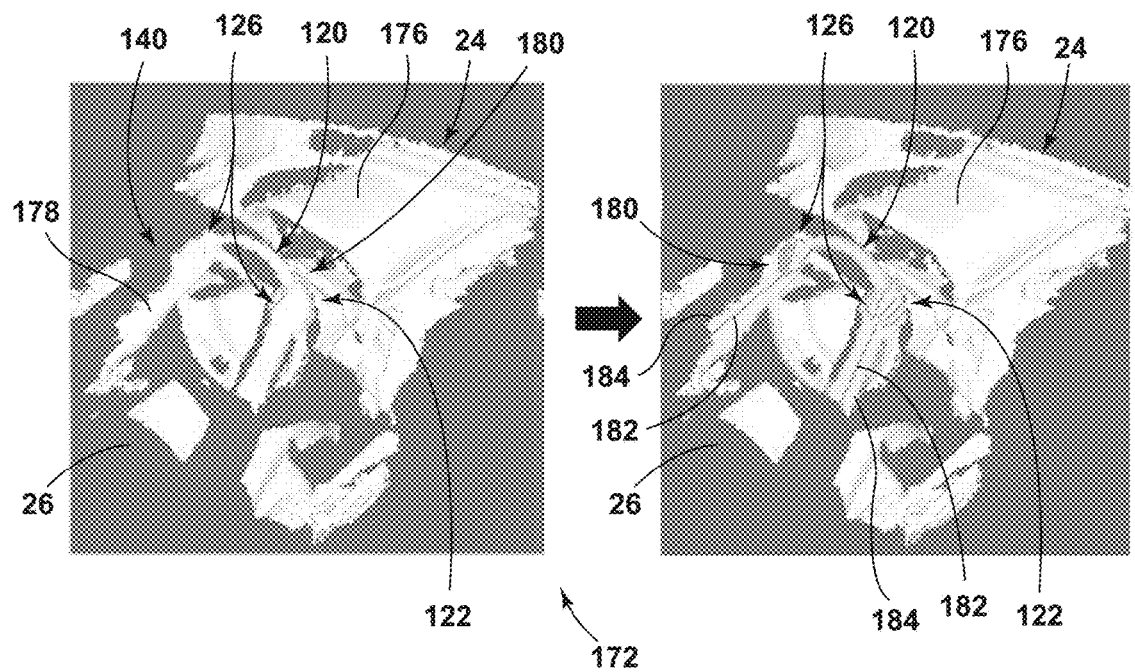
FIG. 8A is a point cloud representing a driver's hands on a steering wheel and demonstrating an object classification feature according to one aspect of the present disclosure.
Figure 8B:
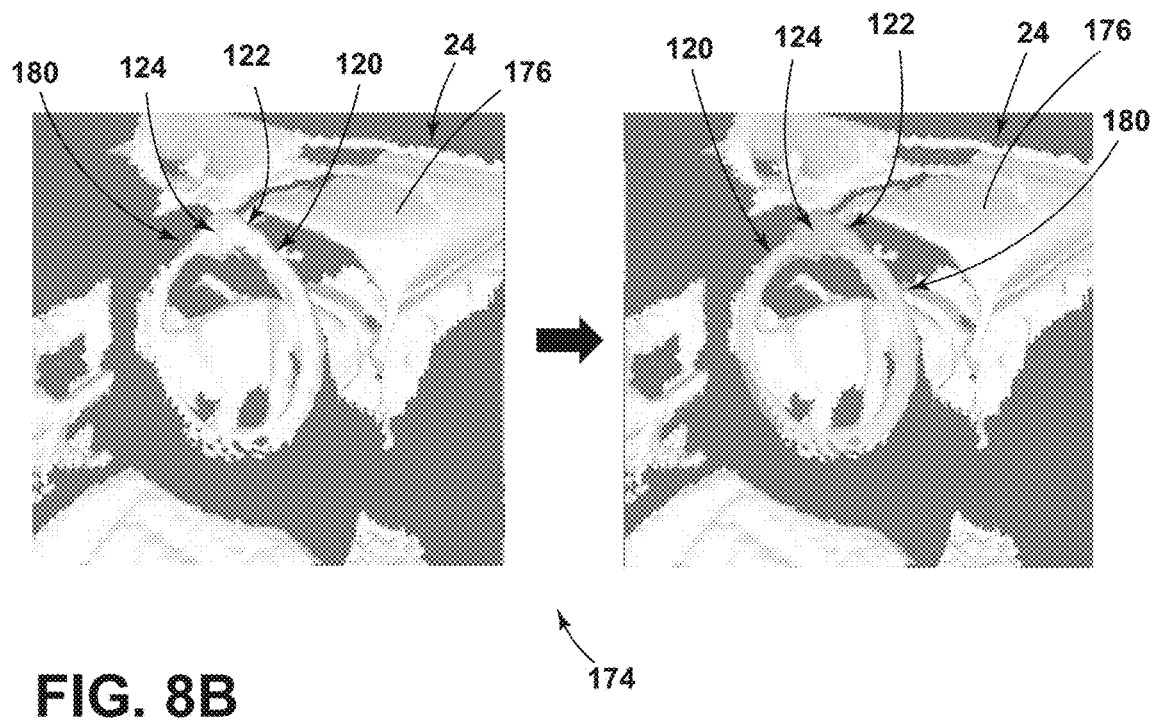
FIG. 8B is a point cloud representing an article attached to a steering wheel and demonstrating an object classification feature according to one aspect of the present disclosure.

Referring now to FIGS. 8A and 8B, the at least one point cloud 24 generated based on the environment 14 at two instances 172, 174 are illustrated. In a first instance 172 illustrated in FIG. 8A, the at least one point cloud 24 includes depth information corresponding to the steering wheel 120, a dashboard 176 of the vehicle 12, arms 178 of the occupant 26, hands 126 of the occupant 26, and other features shown. In the first instance 172, the driver's hands 126 are on an upper portion 180 of the steering wheel 120 and are holding, or engaging, the outer portion 138 of the steering wheel 120. As illustrated in the right side of FIG. 8A, the processing circuitry 40 may be configured to determine the shape of the steering wheel 120 and the object 122 engaging the steering wheel 120. In the present example, the object 122 engaging the steering wheel 120 is the user via the user's arms 178 and hands 126. The skeleton models stored in the skeleton model database 160 may be applied to the at least one point cloud 24 captured or generated by the LiDAR modules 22, as demonstrated by overlaying a section 182 representing an orientation of a corresponding body segment. For example, a pair of segments 184 associated with the arms 178 of the occupant 26 may overlay the shapes in the at least one point cloud 24 corresponding to the arms 178 of the occupant 26. Accordingly, by accessing the skeleton model database 160 and/or the body pose database 158, the pose of the user may be determined with greater precision than that based on other time-of-flight systems and/or stereoscopic imaging systems.

Upon identifying the steering wheel 120 the processing circuitry 40 may compare the shape of the at least one point cloud 24 corresponding to the object 122 to the shape of the at least one point cloud 24 corresponding to the steering wheel 120. Based on comparison of the three dimensional positional information of, for example, a first portion of the at least one point cloud 24 corresponding to the hands 126 to a second portion of the at least one point cloud 24 corresponding to the steering wheel 120, the processing circuitry 40 may determine that the hands 126 of the user engage the steering wheel 120 in the example illustrated in FIG. 8A. For example, depth information at an intersection of the hands 126 and the steering wheel 120 may be substantially similar in the first portion relative to the second portion. Accordingly, the processing circuitry 40 may determine that the hands 126 directly engage the steering wheel 120.

It is contemplated that determination that occupants 26 hands 126 are the object 122 engaging the steering wheel 120 may be accomplished via the object classification unit 156. For example, the object classification unit 156 may apply various skeleton models to the object 122 in various poses to determine a correlation between the at least one point cloud 24 and target point clouds associated with the various body poses and skeleton models. In this way, the processing circuitry 40 may distinguish between the article 128, or foreign object, and hands 126 of the driver 26.

With particular reference to FIG. 8B, an example in which the object 122 is a foreign article is illustrated. Similar to the process described above with respect to FIG. 8A, the processing circuitry 40 may process the at least one point cloud 24 and identify shapes of objects 122 therein. For example, with respect to the right side of FIG. 8B, the processing circuitry 40 may identify a foreign object coupled with the steering wheel 120 by comparing dimensional information (e.g., depth information, height, width, etc.) of the first portion to the second portion of the at least one point cloud 24. Accordingly, the processing circuitry 40 may determine that the weighted object 122, or another foreign object, is disposed along the upper portion 180 of the steering wheel 120 and may further determine the likelihood of a spoofing condition.

In response to detection of the spoofing condition and/or no hands 126 on the vehicle 12, the processing circuitry 40 may communicate with the various vehicle systems previously described in order to alert the user to detection of the spoofing condition and/or alert the user to place hands 126 on the steering wheel 120, depending on the operational mode for the vehicle 12. It is also contemplated that, beyond classifying the object 122 as either the user's hands 126 or a foreign article, the present detection system 10 may further distinguish between various types of objects 122. For example, the at least one point cloud 24 may reveal that the user's hands 126 are engaging the object 122 that directly engages the steering wheel 120. Further, the detection system 10 may detect the presence of only one hand 126 on the steering wheel 120. In this way, various aspects related to interaction between the driver 26 and the steering wheel 120 may be determined in accordance with driver monitoring functions.

In some examples, the detection system 10 may track a number of articles 128 placed on the steering wheel 120 (e.g., spoofing attempts) in sequential instances and cause the processing circuitry 40 to alert another user, such as a guardian, a manager, a business owner, or another administrator (e.g., owner or parent) to the attempted spoof. In this way, the processing circuitry 40 may utilize the LiDAR to detect a spoofing condition and communicate the spoofing condition to an administrator. For example, the processing circuitry 40 may communicate the alert via a wireless network (e.g., the network 163), such as over Wi-Fi, SMS, or another wireless communication technology. In one example, after three spoofing attempts, the processing circuitry 40 may use a cloud support function to notify the administrator that a driver is attempting to spoof the detection system 10.

Figure 9:
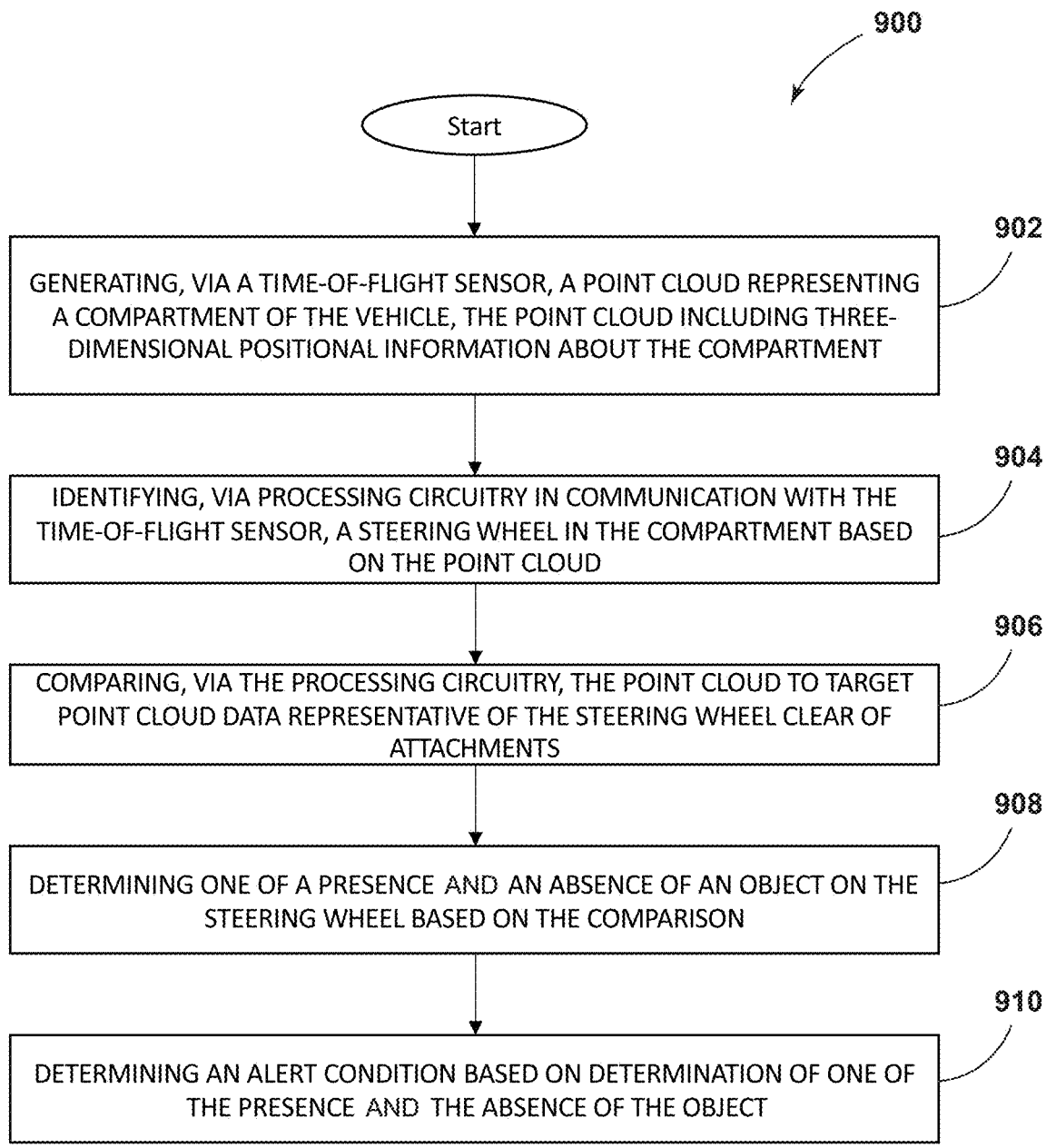
FIG. 9 is a flowchart of an exemplary method for detecting interaction of a user with steering for a vehicle.

Referring now to FIG. 9, a method 900 for detecting interaction of the user with steering for the vehicle 12 includes generating, via the time-of-flight sensor 16, the at least one point cloud 24 representing the compartment 28 of the vehicle 12 at step 902. The at least one point cloud 24 includes three-dimensional positional information about the compartment 28. At step 904, the method 900 further includes identifying, via the processing circuitry 40 in communication with the time-of-flight sensor 16, the steering wheel 120 in the compartment 28 based on the at least one point cloud 24. The method 900 further includes comparing, via the processing circuitry 40, the at least one point cloud 24 to target point cloud data representative of the steering wheel 120 clear of attachments 124 at step 906. The method 900 further includes determining one of a presence and an absence of the object 122 on the steering wheel 120 based on the comparison at step 908. The method 900 further includes determining an alert condition based on determination of one of the presence and the absence of the object 122 at step 910.

The method may further include determining an identity of the object 122 when the object 122 is present, determining a shape of the object 122 based on the at least one point cloud 24, classifying the object 122 as a hand 126 or the article 128 based on the shape, communicated an instruction to at least one vehicle system in response to the alert condition, or any combination thereof. The method may further include adjusting, via the at least one vehicle system, the operational mode of the vehicle 12 to be at least partially autonomous based on the alert condition. The method may further include at the at least one vehicle system, communicating a first indication for the user to remove the article 128 from the steering wheel 120 in response to classifying the object 122 as the article 128.

In addition, or in the alternative, the method 900 may further include at the at least one vehicle system, communicating the second indication for the user to grab the steering wheel 120. The method 900 may further or alternatively include receiving, via the torque sensor 132 configured to detect rotational force on the steering wheel 120 torque information corresponding to a torque on the steering wheel 120. The method 900 may further or alternatively include comparing the rotational force to the at least one point cloud 24. Determination of one of the presence and the absence of the object 122 may further be based on the comparison of the rotational force to the at least one point cloud 24.

The method 900 may further or alternatively include determining the direction of the force caused by the object 122 based on the torque information. The method 900 may further include receiving, via the touch sensor 136 configured to detect contact with the steering wheel 120, the signal indicating engagement with the steering wheel 120. Determination of one of the presence or the absence of the object 122 is based further on the signal.

The method 900 may further or alternatively include comparing the signal to the at least one point cloud 24. Determination of one of the presence or the absence of the object 122 may be based on a comparison of the signal to the at least one point cloud 24. The method 900 in some examples, determining the alert condition is based on the absence of the object 122. The method 900 may further include communicating an instruction to the at least one vehicle system in response to the alert condition and adjusting, via the at least one vehicle system, the operational mode of the vehicle 12 to be at least partially autonomous based on the alert condition. In some examples, the time-of-flight sensor 16 includes the LiDAR module 22 configured to direct light having a wavelength of at least 1500 nm.

Figure 10:
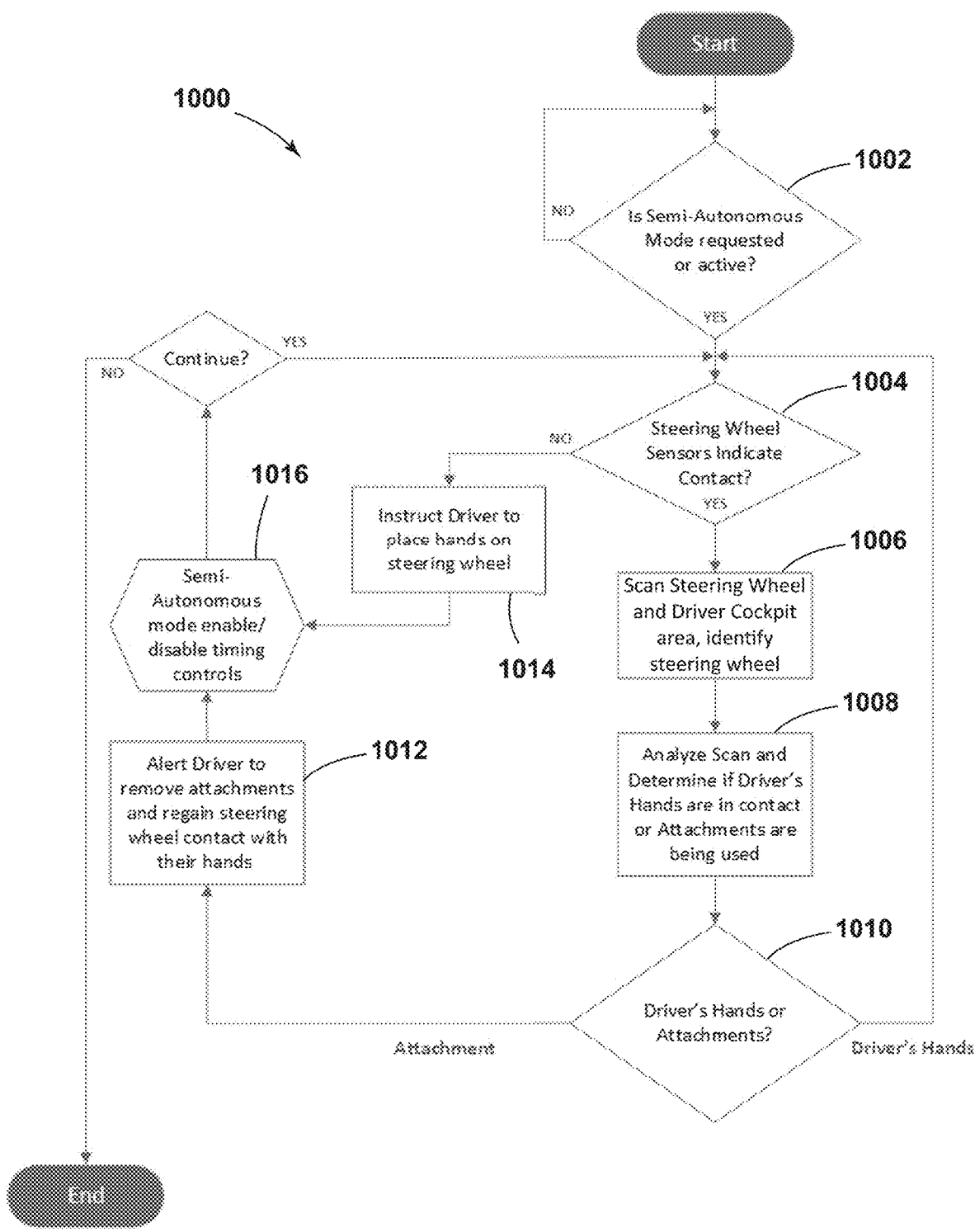
FIG. 10 is a flowchart of an exemplary process for adjusting control of a vehicle using a detection system of the present disclosure.

With reference now to FIG. 10, the present detection system 10 may be configured to employ a process 1000 for detecting user interaction with steering for the vehicle 12. The process 1000, or algorithm, executed by the processing circuitry 40 of the present disclosure may include determining whether a semi-autonomous mode is requested by the user or presently active at step 1002. If semi-autonomous mode is requested or active, the processing circuitry 40 will read from the touch sensor 136 and/or torque sensor 132 of the steering system 102, or any other sensor configured to monitor the steering wheel 120, to determine whether contact is being made with the steering wheel 120 at step 1004. If the sensors indicate that contact is being made with the steering wheel 120, the process 1000 may further scan the steering wheel 120 and the cabin to identify the steering wheel 120 at step 1006. At step 1008, the processing circuitry 40 may process the at least one point cloud 24 generated by the LiDAR modules 22 to determine if hands 126 of the user are engaging the steering wheel 120. For example, the processing circuitry 40 may process the at least one point cloud 24 in the neural networks 163 and/or compare the at least one point cloud 24 to target point cloud data stored in one or both of the body pose database 158 and/or the skeleton model database 160. Further, detection of attachments 124 may include accessing known at least one point cloud 24 for objects 122 not corresponding to hands 126 of a user or other body segments of a user.

At step 1010, the processing circuitry 40 determines whether the object 122 is the driver's hands 126 or a foreign object. If the driver's hands 126 are detected on the steering wheel 120, the process 1000 recursively loops and returns to step 1004. If a foreign object is detected and not the user's hands 126, the process 1000 may alert the driver 26 to remove attachments 124 and regain steering wheel 120 contact with hands 126 of the user at step 1012. At step 1014, which may be the result of the steering wheel sensors not indicating contact with the user, similar steps as 1012 may be performed, with the processing circuitry 40 communicating instruction to alert the driver 26 to place hands 126 on the steering wheel 120. Contemporaneous or following instructions to place hands 126 on the steering wheel 120, the process 1000 may further initiate disengagement of semi-autonomous operations depending on engagement of the user's hands 126 with the steering wheel 120. For example, the detection system 10 may continue to alert, via, for example, noises, visual indicators, or the like, based on the presence of semi-autonomous mode and detection of no hands 126 on the steering wheel 120. To mitigate the alert function, the user may be required to engage with the steering wheel 120, and the user may then be prompted to again attempt semi-autonomous mode. In this way, hands 126 on the steering wheel 120 may be encouraged or promoted during semi-autonomous operation.

In general, the present detection system 10 may detect and initiate enhanced interaction with steering for the vehicle 12. By employing the LiDAR modules 22 to capture depth information that may allow detection of hands 126 and/or foreign objects on the steering wheel 120 of the vehicle 12. The detection system 10 may continuously collect spatial data of the interior 18 on a driver's side of the passenger cabin 32 and isolate, or classify the steering wheel 120, as well as the location of the steering wheel 120 in three-dimensional space. The detection system 10 may further provide detection by comparing current information to the target point cloud data or a computer-aided design (CAD) Model representing the steering wheel 120 in all possible configurations to determine the correct orientation for the steering wheel 120. Following information about the three-dimensional shape of the scanned steering wheel 120, object detection algorithms may detect any object 122 in contact with the steering wheel 120. In response to the detection for identification of the object 122 engaging the steering wheel 120, the detection system 10 may adjust operation of the vehicle 12 as previously described.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for detecting interaction of a user with a steering wheel for a vehicle, the method comprising:
   generating, via a time-of-flight sensor, a point cloud representing a compartment of the vehicle, the point cloud including three-dimensional positional information about the compartment;
   identifying, via processing circuitry in communication with the time-of-flight sensor, the steering wheel in the compartment based on the point cloud;
   receiving, via a torque sensor configured to detect rotational force on the steering wheel, torque information corresponding to a torque on the steering wheel and comparing the rotational force to the point cloud;
   calculating, via the processing circuitry, a projected torque direction or magnitude and comparing the projected torque direction or magnitude to the torque information received at the processing circuitry based on the rotational force detected by the torque sensor;
   comparing, via the processing circuitry, the point cloud to target point cloud data representative of the steering wheel, clear of attachments;
   determining one of a presence and an absence of an object on the steering wheel based on the comparison;
   determining an alert condition based on the determination of one of the presence and the absence of the object;
   communicating an instruction to at least one vehicle system in response to the alert condition; and adjusting, via the at least one vehicle system, an operational mode of the vehicle to be at least partially autonomous based on the alert condition.

2. The method of claim 1, further comprising:
determining an identity of the object when the object is present.

3. The method of claim 2, further comprising:
determining a shape of the object based on the point cloud; and
classifying the object as a hand or an article based on the shape.

4. The method of claim 3, further comprising: at the at least one vehicle system, communicating a first indication to remove the article from the steering wheel in response to classifying the object as the article.

5. The method of claim 4, further comprising:
at the at least one vehicle system, communicating a second indication for the user to grab the steering wheel.

6. The method of claim 1, further comprising:
determining a direction of a force caused by the object based on the torque information.

7. The method of claim 1, further comprising:
receiving, via a touch sensor configured to detect contact with the steering wheel, a signal indicating engagement with the steering wheel, wherein determination of one of the presence and the absence of the object is based on the signal.

8. The method of claim 7, further comprising:
comparing the signal to the point cloud, wherein determination of one of the presence or the absence of the object is based on the comparison of the signal to the point cloud.

9. The method of claim 1, wherein determining the alert condition is based on the absence of the object.

10. The method of claim 1, wherein the time-of-flight sensor includes a LiDAR module configured to detect light having a wavelength of at least 1500 nm.

11. A system for detecting interaction of a user with a steering wheel for a vehicle, the system comprising:
a torque sensor configured to detect rotational force on the steering wheel;
a time-of-flight sensor configured to generate a point cloud representing a compartment of the vehicle, the point cloud including three-dimensional positional information about the compartment;
processing circuitry in communication with the time-of-flight sensor and the torque sensor, the processing circuitry configured to:
calculate a projected torque direction or magnitude and compare the projected torque direction or magnitude to torque information received at the processing circuitry based on the rotational force detected by the torque sensor;
identify the steering wheel in the compartment based on the point cloud;
compare the point cloud to target point cloud data representative of the steering wheel clear of attachments;
determine one of a presence and an absence of an object on the steering wheel based on the comparison; and
determine an alert condition based on the determination of one of the presence and the absence of the object; and
at least one vehicle system configured to control an at least partially autonomous operating mode of the vehicle based on the alert condition.

12. The system of claim 11, wherein the processing circuitry is further configured to:
determine a shape of the object based on the point cloud; and
classify the object as a hand or an article based on the shape.

13. The system of claim 12, further comprising:
a first indication to remove the article from the steering wheel in response to the processing circuitry classifying the object as the article.

14. The system of claim 13, further comprising:
a second indication for the user to grab the steering wheel.

15. A system for detecting interaction of a user with a steering wheel for a vehicle, the system comprising:
a time-of-flight sensor configured to generate a point cloud representing a compartment of the vehicle, the point cloud including three-dimensional positional information about the compartment;
a torque sensor configured to detect rotational force on the steering wheel;
an attachment classification database configured to store torque data corresponding to the shape of various objects;
a vehicle system configured to control at least partially autonomous operation of the vehicle; and
processing circuitry in communication with the time-of-flight sensor and the vehicle system, the processing circuitry configured to:
identify the steering wheel in the compartment based on the point cloud;
compare the point cloud to target point cloud data representative of the steering wheel clear of attachments;
determine the presence of an object on the steering wheel based on the comparison;
determine an alert condition based on determination of the presence of the object;
determine an identity of the object;
determine a shape of the object based on the point cloud;
classify the object as a hand or an article based on the shape; and
communicate an instruction to the vehicle system to adjust to an autonomous operation of the vehicle based on the classification of the object.

16. The method of claim 1, wherein the processing circuitry is further configured to determine a direction of a force caused by the object based on the torque information.

17. The method of claim 16, wherein the processing circuitry is further configured to identify the location and presence of the object on the steering wheel and associate the force with the object detected based on the at least one point cloud.

18. The system of claim 15, wherein the attachment classification database is further configured to store a library of device shapes corresponding to the shapes of different objects.

19. The system of claim 18, wherein the various shapes and identities of the different objects are employed for training various machine learning models configured to identify the particular identity of the different objects.

* * * * *